United States Patent [19]
Takeda

[11] 3,833,807
[45] Sept. 3, 1974

[54] DIGITAL LENGTH MEASURING MEANS
[75] Inventor: Hideomi Takeda, Tokyo, Japan
[73] Assignee: Asahi Kogaku Kogyo Kabushiki Kaisha, Tokyo-to, Japan
[22] Filed: June 8, 1973
[21] Appl. No.: 368,307

[30] Foreign Application Priority Data
June 21, 1972 Japan.............................. 47-62108

[52] U.S. Cl.......... 250/234, 250/231 R, 250/237 G, 356/169
[51] Int. Cl. ............................................ G01d 5/30
[58] Field of Search............ 250/237 G, 231 R, 234, 250/216; 356/106 R, 110-113, 169, 170

[56] References Cited
UNITED STATES PATENTS

| | | | |
|---|---|---|---|
| 3,531,650 | 9/1970 | Cronin............................ | 250/237 G |
| 3,578,980 | 5/1971 | Decker et al. .................. | 250/237 G |
| 3,617,134 | 11/1971 | Frush.............................. | 356/170 X |
| 3,749,501 | 7/1973 | Wieg................................ | 356/169 |

Primary Examiner—Walter Stolwein
Attorney, Agent, or Firm—Knobbe, Martens, Olson, Hubbard & Bear

[57] ABSTRACT

A digital length measuring means including a transparency diffraction grating, a base plate having a mirror plane which is inclined with respect to the surface of the grating and an optical system arranged with respect to said diffraction grating and said base plate to produce Moire fringe contour lines, which are photoelectrically transformed into pulses which indicate certain unit lengths of relative shift of the Moire fringe lines caused by moving said diffraction grating and said optical system as a unit in a direction perpendicular to the grating lines.

In a variation, two or more photoelectric elements may be provided to divide into equal parts one period of the Moire fringe lines produced at the image forming plane of the optical system. Also the transparency diffraction grating may be formed of two complex gratings whose grating lines are shifted by one-fourth pitch from each other, and two photoelectric transforming devices are provided corresponding to each of these two gratings so that the pulses indicating unit length are more finely divided. In another variation, the mirror plane of the base plate placed opposite to the transparency diffraction grating is formed with a triangular waveform and is positioned parallel to the grating surface.

10 Claims, 11 Drawing Figures

PATENTED SEP 3 1974 3,833,807

DIGITAL LENGTH MEASURING MEANS

The present invention relates to a digital length measuring means which carries out measurement of length or reading of positions utilizing Moire fringe contour lines.

It is well known that the three-dimensional configuration of an object can be known through visible contour lines over the object utilizing Moire fringes. Further, various digital length measuring means have been known, such as, one based on laser interferometer, the Moire fringe length measuring means employing two transparency gratings, the so-called inductosyn based on magnetism, etc. Almost all of these, however, are of complicated structure and of high cost, and have a problem in maintenance. It is considered to be owing to such drawbacks that such length measuring means are not yet widely used.

The object of the present invention is to eliminate the above mentioned drawbacks and to provide a length measuring means which is of simple structure, of high sensitivity and economical in cost.

In accordance with the present measurement system, a base plate having a mirror plane is positioned on an incline with respect to the surface of a transparency diffraction grating. A source of light is directed through the grating and onto the mirror plane to produce fringe contour lines on the plane, and photoelectric means are positioned to observe the contour lines. By moving the grating, or the base plate, or the light source and the photoelectric means, fringe contour lines may be shifted in a direction intersecting the diffraction grating lines. The signals from the photoelectric means are electrically transformed into pulses which indicate unit length of the shifting of the fringe lines. If desired the optical components and the grating may be conveniently moved as a unit with respect to the base plate.

For greater sensitivity of measurement, more than one photoelectric element may be utilized to divide into parts one period between fringe lines produced to the mirror plane. As another approach two complex gratings may be utilized with their grating lines shifted from each other and two photoelectric transforming devices may be employed so that the pulses indicating unit length are finely divided. To keep the system compact the base plate may be formed with a triangular waveform on its mirrored surface, with the base plate extending generally parallel to the diffraction grating.

Now, a detailed description of the present invention will be given herebelow with reference to the attached drawings.

Figure 6:
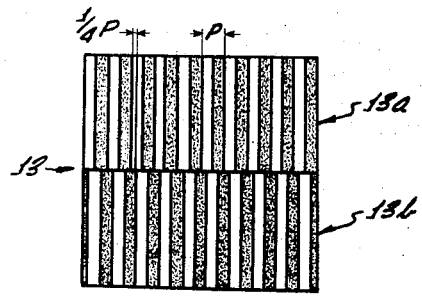
FIG. 6 shows a complex grating 13 for obtaining sine and cosine wave Moire fringe photoelectric transformation signals.
Figure 7A:
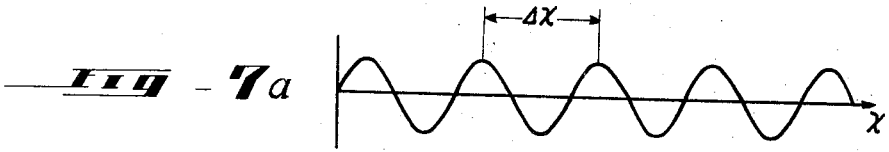
Figure 7B:
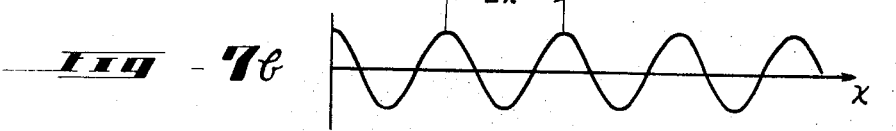
Figure 7C:
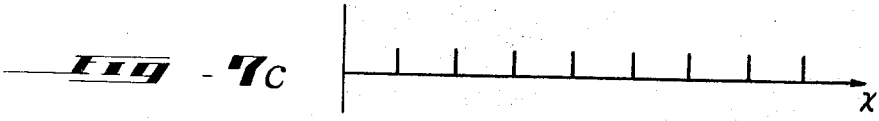
Figure 7D:
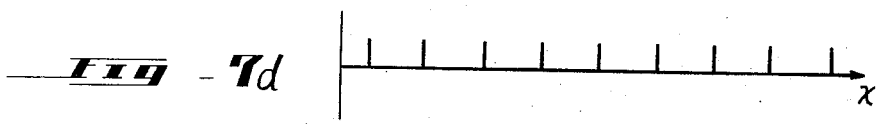

FIGS. 7a–d show Moire fringe photoelectric transformation signals obtained by the complex grating 13 as shown in FIG. 6.

Figure 1:
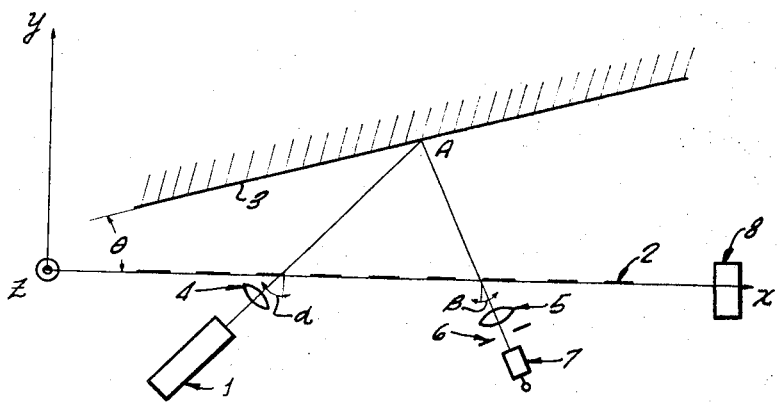
FIG. 1 shows the principle of the present invention.

FIG. 1 shows the principle of the present invention. The pencil of light rays from the light source 1 is converted by a collimator lens 4 into enlarged pencil of parallel light rays. It is well known that when such parallel light rays illuminate for example the surface of a plane base plate (hereinafter referred to as "base plate") 3 such as the well-polished surface of a metal plate through a transparency diffraction grating 2, then Moire fringe contour lines are observed through the grating 2. It is assumed that the grating lines are approximately parallel with Z-axis. Further, it is assumed that the incident light and the direction of observation are at angles $\alpha$ and $\beta$ with the grating 2, respectively, and that the measurement is made with respect to a point A on the base plate 3. If the base plate 3 is a plane which is at an angle $\theta$ ($\theta \neq 0$) with the grating 2 as shown in FIG. 1, then there are obtained Moire fringe contour lines like grating lines of equal pitch distributed in the direction of x-axis. It is well known that the light intensity of the thus obtained Moire fringe contour lines varies in the manner of a sinusoidal wave in the direction of x-axis.

Figure 2:
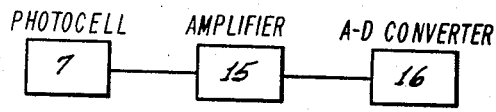
FIG. 2 shows an electric system which makes photoelectric transformation and electric treatment of Moire fringe signals.
Figure 3A:
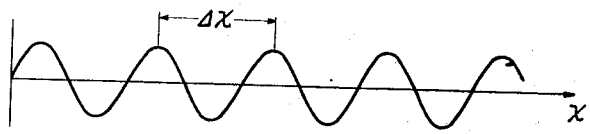
FIGS. 3a and 3b show output waveforms of the electric system of FIG. 2.

By means of a condensing lens 5, the image of the Moire fringe contour lines of above mentioned light intensity is formed at a slit 6. The light of such image is received by a photoelectric element 7 which is placed immediately behind the slit 6 and on the optical axis of the condensing lens 5 so as to carry out photoelectric transformation. When the grating 2 is moved by a driving means 8 along x-axis, the Moire fringe contour lines are also moved so that a photoelectric transformation output of sinusoidal waveform is obtained in accordance with the movement of the grating 2. When this photoelectric output is processed by an electric system shown in FIG. 2, there is obtained a series of pulses whose number is proportional to the number of the Moire fringe contour lines: The output of the photoelectric element 7 (FIG. 3(a)) is amplified by an amplifier 15, and then, through an A – D converter 16, there are obtained pulses as shown in FIG. 3 (b).

Figure 3B:
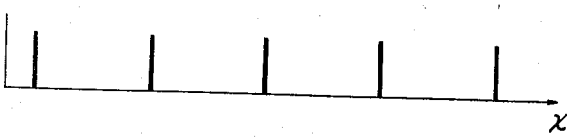

From the aforementioned principle of contour lines of equal pitch, the photoelectric transformation output as shown in FIG. 3 (a) contains not only the information about the distance in y-axis direction from the grating 2 to the base plate 3 but also the information about the distance in x-axis direction. Therefore, it is possible to measure the distance in x-axis direction by scanning the Moire fringe contour lines. In this case, the distance $\Delta x$ in x-axis direction corresponding to one pitch of the Moire fringe contour lines as shown in FIG. 3 (a) is given by:

$$\Delta x = p/\tan \theta \, (\alpha + \tan \beta) \qquad (1)$$

where $p$ is the pitch of the grating 2, $\theta$ is the angle made by the grating 2 and the base plate 3, $\alpha$ is the angle of incidence and $\beta$ is the angle made by the direction of observation and the grating 2. Accordingly, $\Delta x$ represents, according to the aforementioned principle, the unit length in the x-axis direction to be measured, namely the measurement sensitivity. Assuming now that $p = 0.01$mm, $\theta = 6°$, and $\alpha = \beta = 45°$, then $\Delta x \approx 0.05$mm. In this numerical example it is possible to carry out measurement with a sensitivity of 1 bit = 50μ.

Figure 4:
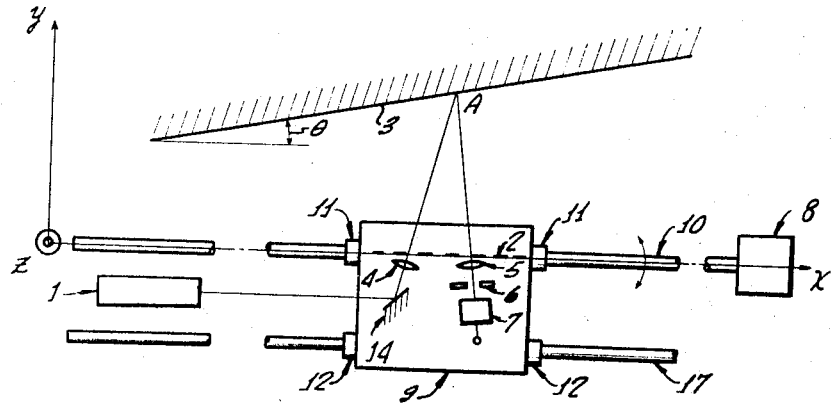
FIG. 4 shows one example of the present invention based on the principle of FIG. 1.
Figure 5:
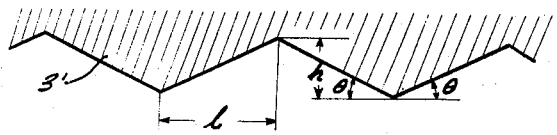
FIG. 5 shows a base plate 3' of triangular waveform to be employed in measuring long distances.

FIG. 4 shows one example according to the principle of the present invention. Practically, it is not desirable to provide a large grating having a length that is equal to the range of measurement because it is technically difficult and not efficient to produce gratings of high accuracy. Accordingly, arrangement is so made that, as shown in FIG. 4, the entire optical system, including a mirror 14, except the light source 1 is placed in a slider 9; and a driving means 14 causes a guide screw 10 to be rotated so that, through nuts 11, bushes 12 and a guide 17, the slider 9 is moved along x-axis. By this arrangement it is possible to produce Moire fringe contour lines at any point on x-axis and at the same time to carry out scanning, so that it is possible to obtain photoelectric output indicating the variation of the number of Moire fringe contour lines in accordance with the movement of the slider 9. As the measurement range increases, the distance between the grating 2 and the point A on the base plate 3 to be measured increases and the contrast of the Moire fringe contour lines diminishes. However, no trouble is caused if electric processing such as automatic gain control circuit or zero-cross method is made to the photoelectric output. Such contrast diminution is remarkable in the case of incoherent light source having expanse and can be decreased by employing coherent light sources such as laser. Owing to the above mentioned contrast diminution of Moire fringe contour lines, such arrangement is effective only for small measurement range. As the distance between the grating 2 and the base plate 3 becomes larger, the width of the entire arrangement in the direction of y-axis becomes larger and the arrangement becomes not suitable for practical use. Accordingly, for measurement of larger distance, in order to prevent the aforementioned contrast diminution and to make the size of the arrangement smaller, a base plate 3' of triangular waveform may be employed in a position which is parallel with the grating surface, as shown in FIG. 5. If it is assumed that $\theta = 6°$ and $l = 100mm$, then $h \approx 10mm$. As this numerical value indicates, it is possible to keep very small the width in y-axis direction of the base plate 3' of triangular waveform. In the vicinity of the crest or the trough of the base plate 3' the light intensity of the Moire fringe contour lines varies continuously and no trouble is produced in the photoelectric detection.

The measurement sensitivity of this arrangement is as follows: In order to obtain a pulse for each predetermined measurement digit from the photoelectric transformation signal of the Moire fringe contour lines as shown in FIG. 3 (a), zero-cross method may be introduced in which a pulse is generated for each x-axis intercept. In this case the measurement digit is ½ period of sinusoidal wave. For the above mentioned numerical example there is obtained a measurement sensitivity of 1 bit = 22μ.

This measurement sensitivity can be increased by other methods, two of which are set forth below. According to the first method, instead of the grating 2 as shown in FIG. 1 or FIG. 4, there is introduced a complex grating 13 (FIG. 6) where the upper grating 13a and the lower grating 13b are shifted by ¼ pitch from each other. The upper grating 13a and the lower grating 13b are each provided with a photoelectric element and scanning of the Moire fringe contour lines is carried out on the basis of the aforementioned principle. As resulting photoelectric transformation signals there are obtained sine and cosine wave output signals corresponding to said gratings respectively, and this fact is utilized. The sine wave output ($a$) and the cosine wave output ($b$) of FIG. 7 are A – D converted by the aforementioned zero-cross method into pulses ($c$) and ($d$), respectively. Employing the pulses ($c$) and ($d$), it is possible to count the movement of the slider 9 with a sensitivity corresponding to ¼ times the pitch $\Delta x$ of the Moire fringe contour lines. FIG. 7, ($a$) and ($b$) show waveforms obtained as a result of processing the photoelectric transformation signal by an automatic gain control circuit. A further advantage of employing such complex grating 13 is that, through electric circuit processing of such two output signals, it is possible to discriminate the sense of the movement of the slider 9. This is readily carried out for example by a sense-discriminating logic circuit and a reversible counter. As such art are well known, a detailed description therefore is omitted.

According to another method, the sine and cosine wave output signals are digitally division-interpolated by a servo system with a synchro-resolver or by a computing transformer so that it is possible to carry out measurement of very high sensitivity. These arts are also well known.

Considering the above mentioned methods from a different point of view, it becomes possible to make the measurement sensitivity variable: If in the first method a plurality of gratings of different pitches are employed and in the second method the division intervals are made variable by electric operation, then by each method there are obtained pulses of different measurement digits. Thus, if arrangement is so made that the user can select any sensitivity by means of a simple switch circuit, then it is possible to make the measurement sensitivity variable. Also, it is clear from the principle of the present invention that the measurement sensitivity can be made variable by making $\alpha$ and $\beta$ in FIG. 1 variable.

As described above, the main part of the length measuring means according to the present invention is of simple structure consisting of one set of grating and base plate. If the base plate is made of steel plate, the thermal expansion coefficient difference from the machine or other body to which the means according to the present invention is attached is small, and since the width of the grating lines is small, thermal expansion exerts small influence on measurement accuracy. Further, the measurement is made according to non-contact method and the structure is simple as mentioned before, so that the arrangement is rigid and of long life.

The light source need not be coherent as a laser but incoherent light sources such as mercury lamp may be employed. However, since laser light is of small beam diameter and good directivity, a laser light source can be positioned outside the slider and can make the size of the arrangement smaller. Further advantages of laser light are that, since laser light is of good coherency at high brightness, the contrast of the obtained Moire fringe contour lines is high so that circuit processing such as photoelectric detection and amplification can be readily carried out, and that a large distance between the grating and the base plate can be introduced.

In connection with illumination of the grating, it is well known that, instead of the parallel illumination as shown in FIG. 1, divergent illumination also produces similar Moire fringe contour lines. In this case, however, as is clear in the theory about photographing of Moire fringe contour lines, for establishment of the relation as indicated by the formula (1), the light source and the point of observation must be at equal distance from the grating surface.

The base plate may be of any material having an excellent reflecting surface such as mirror, prism, metal surface, and further, surfaces of some light scattering nature such as plated surface, coated surface, etc.

Now description will be made herebelow of Abbe's error and the measurement error owing to the plane accuracy of the base plate. In the example as shown in FIG. 4, if the slider 9 is swung by a very small angle $\phi°$ with respect to x-axis within the plane of FIG. 4, then the measurement sensitivity $\Delta x$ of the formula (1) is transformed into $\Delta x'$ as indicated by the following formula (2):

$$\Delta x' = \overline{p\{1 - \phi \tan(\theta - \phi)\}}/\overline{\tan \theta \{\tan(\alpha - \beta) + \tan \beta\}}$$

(2)

Accordingly, if it is assumed that $p = 0.01$mm, $\theta = 6°$, $\alpha = \beta = 45°$ and that measurement error up to 1/10 of sensitivity is tolerated, then the meandering of the slider, that is, Abbe's error can be tolerated approximately up to $\phi = 1'$, which is a considerably large tolerance, considering that the meandering of machine tools is generally 3–5 seconds. On the other hand, the relation between the plane accuracy H of the base plate and the measurement sensitivity is given by:

$$H \cos \theta < \Delta x \tan \theta$$

(3)

Accordingly, if $\Delta x = 0.05$mm and $\theta = 6°$, then $H < 0.005$mm. Thus, under such condition, the base plate is required to have plane accuracy of $5\mu$. The surface coarseness of such degree can be readily realized so that this is practically not a drawback of the arrangement according to the present invention.

Thus, the advantages of the length measuring means according to the present invention are as follows:

*i.* The structure is simple.

Compared with conventional digital length measuring means, the means according to the present invention is of very simple structure, so that the number of factors which restrict the operation is small and installation, handling and maintenance of the arrangement can be carried out in a ready manner.

*ii.* The means is highly accurate.

The photoelectric transformation output of Moire fringe contour lines is the analogue amount of sinusoidal waveform. Accordingly, length measurement digits of still higher accuracy can be obtained by digitally division-interpolating up to ¼ – 1/100 of the period of the sinusoidal wave by means of a resolver or a computing transformer.

*iii.* The means is highly economical.

Compared with conventional length measuring means, the means according to the present invention is economical since the structure is simple, consisting mainly of a set of transparency diffraction gratings and corresponding inclined planes.

*iv.* The length to be measured is limitless.

According to the principle of the means of the present invention, the measurement sensitivity is not directly related to the coherency of the light source. Therefore, unlike the case of general interferometer, the length to be measured is not limited by the coherency of the light source.

*v.* Owing to the principle and structure of the means according to the present invention, influences from outside such as variation of temperature and air pressure and shaking are smaller than those in the case of conventional optical length measuring means.

*vi.* Owing to non-contact measurement system, there is no part to be worn out, and the arrangement is rigid and of long life.

If the means according to the present invention is installed in x-, y- and Z-axis directions, then it is possible to make coordinate measurement not only one-dimensionally but also two-and three-dimensionally. Thus, the means according to the present invention may be used as a length measurement unit for digital control machine, a position reading apparatus, for examination of transportation accuracy of large machine tools, etc.

Thus, the present invention provides a practical length measuring means of above mentioned advantage with low cost, excellent operational efficiency and high sensitivity for the wide field of mechanical art.

What is claimed is:

1. Digital length measuring apparatus comprising:
   a single transparency diffraction grating;
   a base plate having a mirror plane inclined with respect to the surface of the grating;
   an optical system arranged with respect to the grating and the mirror plane to produce fringe contour lines on the mirror plane including a light source for directing light through the grating onto the mirror plane and photoelectric means for observing the contour lines;
   means for moving one of said grating, base plate and optical system in a manner to produce shifting of said fringe lines in a direction to intersect the diffraction grating lines; and
   electric circuit means for transforming the signals from said photoelectric means into pulses which indicate unit length of said shifting of said fringe lines.

2. The apparatus of claim 1 wherein said optical system and said grating are movable as a unit.

3. The apparatus of claim 1 wherein said optical system includes a mirror receiving light from the light source and reflecting it through the grating onto the base plate; and including means for mounting as a unit the mirror, the grating, and the photoelectric means; and means for moving said unit in a direction intersecting the grating lines.

4. The apparatus of claim 1 wherein said photoelectric means includes photoelectric elements positioned to divide into parts one period between fringe lines produced at said mirror plane.

5. The apparatus of claim 1 wherein said grating comprises two complex gratings whose grating lines are shifted from each other and said photoelectric means include two photoelectric transforming devices arranged with respect to the gratings so that the pulses indicating unit length are finely divided.

6. The apparatus of claim 1 wherein the base plate is formed with a triangular waveform having a mirrored surface and the base plate extends generally parallel to the diffraction grating while the mirror surfaces of the base plate are angled with respect to the grating.

7. A method of digitally measuring length comprising the steps of:
    directing a source of light through a single diffraction grating onto a mirror plane inclined with respect to said grating surface to form fringe contour lines;
    observing the contour lines at a point on the plane with photoelectric means;
    moving the apparatus in a manner to shift said fringe lines in a direction intersecting the diffraction grating lines; and
    transforming the signals from the photoelectric means into pulses which indicate unit length of said shifting of said fringe lines.

8. The method of claim 7 including moving the diffraction grating, the light source and the photoelectric means as a unit relative to the mirror plane to cause said shifting of the fringe lines.

9. The method of claim 7 including observing with said photoelectric means the mirror plane in a manner to divide into parts one period between fringe lines.

10. The method of claim 7 wherein said grating comprises two complex gratings whose grating lines are shifted from each other and said photoelectric means include two photoelectric transforming devices arranged with respect to the gratings so that the pulses indicating unit length are finely divided.

* * * * *